Dec. 23, 1924.
C. J. McCLURE
LIQUID LEVEL GAUGE
Filed May 17, 1922
1,520,361
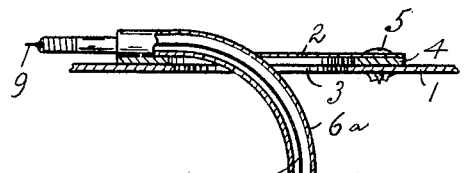
FIG. 1.
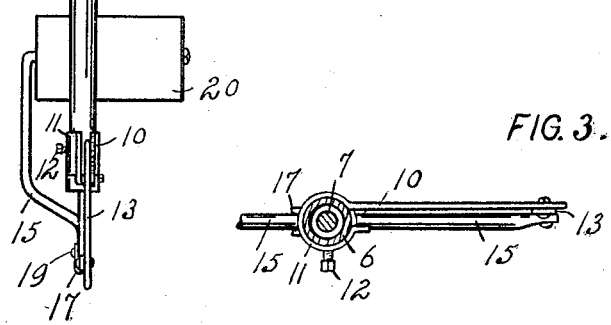
FIG. 3.
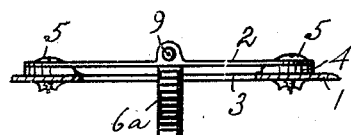
FIG. 2.
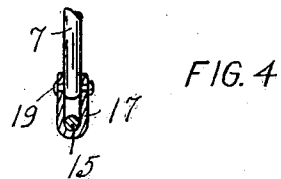
FIG. 4
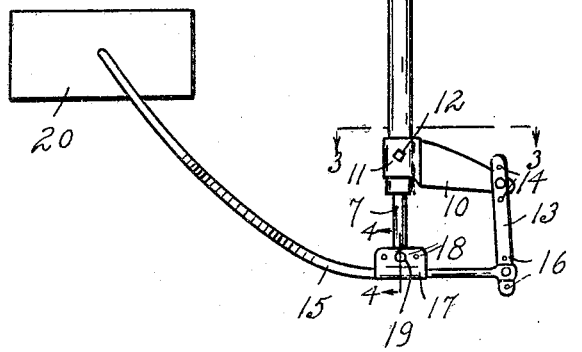
CHARLES J. McCLURE
INVENTOR.
BY R. W. Smith
ATTORNEY.

Patented Dec. 23, 1924.

1,520,361

UNITED STATES PATENT OFFICE.

CHARLES J. McCLURE, OF EAGLE ROCK, CALIFORNIA.

LIQUID-LEVEL GAUGE.

Application filed May 17, 1922. Serial No. 561,599.

*To all whom it may concern:*

Be it known that I, CHARLES J. MCCLURE, a citizen of the United States, residing at Eagle Rock, county of Los Angeles, State of California, have invented new and useful Improvements in Liquid-Level Gauges, of which the following is a specification.

This invention relates to the float mechanism of a gasoline gauge or the like, particularly adapted to be used in connection with a motor vehicle, said guage preferably comprising an indicator mounted upon the instrument board of the vehicle, and moved in one direction by a flexible connection secured to the float mechanism, as the liquid level in the fuel tank is lowered; and said indicator being moved in the opposite direction by a suitable spring, as the tension upon the flexible connection is released upon rising of the fuel level.

It is the object of the invention to provide a float mechanism adapted for variable positioning of the float as is most convenient and depending upon the shape of the fuel tank, while still causing the flexible connection to extend directly toward the indicator from the float mechanism, so as to eliminate the possibility of binding.

It is a further object of the invention to provide a float construction, in which there will be no lost motion, so that an accurate measurement may be obtained.

It is a still further object of the invention to construct the float mechanism so that the float may be raised and lowered relative to the fuel tank, in order to adapt the device to fuel tanks of different sizes, and to also provide for any desired range of movement of the float.

The invention will be readily understood from the following description of the accompanying drawings in which:

Fig. 1 is a side elevation of the float mechanism mounted upon a fuel tank.

Fig. 2 is a front elevation of the same.

Figs. 3 and 4 are detail sections on the lines 3—3 and 4—4 of Fig. 2.

The float mechanism is illustrated as used in the fuel tank 1 of an automobile, said mechanism comprising a disc 2 mounted over an opening 3 in the tank, with a gasket 4 between the disc and said tank. The disc may be held in place by screws 5.

A tube 6 extends vertically below the disc so as to be received in tank 1, and the upper end of the tube is curved as shown at $6^a$, so as to extend through disc 2 and lie upon the upper surface thereof. The tube is thus supported by the disc, and the latter is so mounted on the fuel tank that the radially extending end of the tube will project toward the indicator with which the float mechanism is employed.

An operating rod 7 is adapted to slide in tube 6, and is connected at its upper end to a flexible connection, shown as a wire 9, which extends through the portion of the tube $6^a$ and is connected to the indicator employed in connection with the float mechanism.

A bracket 10 is provided with a clamping head 11 received on tube 6, said bracket being adapted for both longitudinal adjustment along the tube as well as rotary adjustment on said tube. The bracket may be fixed in any desired position, as by a set screw 12.

A link 13 is pivoted to bracket 10, preferably by an adjustable connection provided by a plurality of pivot holes 14 arranged along the link.

A float arm 15 is pivoted to the opposite end of the link, said pivotal adjustment being preferably also adjustable, as provided for by a series of pivot holes 16 in the link.

The float arm extends transversely below tube 6, and is pivoted to the rod 7. For this purpose a bracket 17 is fixed upon the float arm, and is provided with a plurality of pivot holes 18 lengthwise of the float arm, and through one of which a pivot 19 carried by the rod 7 is adapted to be received, in order to provide an adjustable connection between the float arm and the operating rod 7.

A float 20 of usual construction is pivoted upon the free end of the float arm.

It will be noted that the device as thus described may be readily placed in position and withdrawn through opening 3. while still permitting the link 13 to be of any desired length in order to obtain a desired range of movement of the float, since when the device is removed or placed in position, the float arm may be swung downwardly until the link is substantially parallel to tube 6, in which position it will pass through opening 3.

It will be further observed that the adjustments provided by holes 14—16 will allow the float arm any desired range of movement depending upon the size of tank 1. The adjustment provided by holes 18 will allow the rod 7 to be arranged for free sliding movement in tube 6 and thus prevent binding, irrespective of the adjustment of the link connection.

The adjustment of bracket 10 along the tube 6 adapts the device to tanks of different depth, and the rotary adjustment of the bracket on the tube, will cause the float arm to extend in any desired direction, while still permitting the flexible connection to extend from the float mechanism in a direct line towards the indicator means, so as to prevent binding.

It will be understood that different gasoline tanks have their greatest depth in different portions thereof, and that it is desirable that the float arm extend in a direction to position the float at the portion of the tank having the greatest depth. In the present construction such adjustment of the float arm is accomplished by the rotary adjustment of bracket 10.

While I have illustrated and described the preferred practical embodiment of the device, it will be apparent that various changes may be made in the construction, combination, and arrangement of parts without departing from the spirit of the invention.

What is claimed is:

1. A float mechanism comprising a closure disc having an opening therethrough, a curved tube extending through said opening and having an upper straight end extending radially of said disc and a lower straight end depending vertically from said disc, an operating rod in said tube and extending below the lower end thereof, a bracket rotatably and longitudinally adjustable on the lower straight end of said tube, a link pivoted at one end to said bracket, a float arm pivoted to the opposite end of said link, means for adjusting one of said pivotal connections, a pivoted connection between the depending end of said operating rod and said float arm, and means for adjusting said pivotal connection along said float arm.

2. A float mechanism comprising a straight vertically depending supporting tube, an operating rod in said tube and extending below the lower end thereof, a bracket rotatably and longitudinally adjustable on said supporting tube, a float arm pivoted to said bracket, and a pivotal connection between said depending end of said operating rod and said float arm.

3. A float mechanism comprising a supporting tube, an operating rod in said tube and extending below the lower end thereof, a bracket rotatably adjustable on said supporting tube, a link pivoted at one end to said bracket, a float arm pivoted to the opposite end of said link, and a pivotal connection between the depending end of said operating rod and said float arm.

4. A float mechanism comprising a straight vertically depending supporting tube, an operating rod in said tube and extending below the lower end thereof, a bracket longitudinally adjustable on said supporting tube, a link pivoted at one end to said bracket, a float arm pivoted to the opposite end of said link, and a pivotal connection between the depending end of said operating rod and said float arm.

5. A float mechanism comprising a supporting tube, an operating rod in said tube and extending below the lower end thereof, a bracket on said tube, a link pivoted at one end to said bracket, a float arm pivoted to the opposite end of said link, a pivotal connection between the depending end of said operating rod and said float arm, and means for adjusting said pivotal connection along said float arm.

In testimony whereof I have signed my name to this specification.

CHARLES J. McCLURE.